US 6,540,058 B2

(12) United States Patent
Drexl et al.

(10) Patent No.: US 6,540,058 B2
(45) Date of Patent: Apr. 1, 2003

(54) ACTUATION DEVICE FOR A FRICTION CLUTCH IN A DRIVETRAIN

(75) Inventors: Hans-Jürgen Drexl, Schonungen (DE); Thomas Otto, Würzburg (DE); Reinhold Weidinger, Unterspiesheim (DE)

(73) Assignee: Mannesmann Sachs AG, Schweinfurt (DE)

( * ) Notice: Subject to any disclaimer, the term of this patent is extended or adjusted under 35 U.S.C. 154(b) by 0 days.

(21) Appl. No.: 09/834,072

(22) Filed: Apr. 12, 2001

(65) Prior Publication Data

US 2001/0030096 A1 Oct. 18, 2001

(30) Foreign Application Priority Data

Apr. 14, 2000 (DE) .......................................... 100 18 678

(51) Int. Cl.[7] ............................................... F16D 48/06
(52) U.S. Cl. .............................. 192/85 CA; 192/30 W; 192/70.13; 192/91 A
(58) Field of Search .......................... 192/85 CA, 91 A, 192/98, 30 W, 70.13

(56) References Cited

U.S. PATENT DOCUMENTS

| 5,133,439 | A | * | 7/1992 | Shellhause ............... 192/70.13 |
| 5,950,788 | A | | 9/1999 | Willert et al. ............ 192/85 CA |
| 6,116,399 | A | * | 9/2000 | Drexl et al. ............ 192/85 CA |
| 6,167,995 | B1 | | 1/2001 | Lindner | |

FOREIGN PATENT DOCUMENTS

| DE | 197 16 600 | 12/1997 |
| EP | 0 497 164 A1 | 8/1992 |
| WO | WO 97/29297 | 8/1997 |

* cited by examiner

Primary Examiner—Rodney H. Bonck
(74) Attorney, Agent, or Firm—Cohen, Pontani, Lieberman & Pavane (57) ABSTRACT

An actuation device for a friction clutch arranged in a drivetrain of a motor vehicle between a drive unit and a transmission in a housing having a pressure medium force cylinder arrangement arranged in the housing, which preferably comprises a pressure medium force ring cylinder. The friction clutch can be actuated by means of this pressure medium force cylinder arrangement via a release bearing arrangement which is moveable coaxial to the friction clutch. A measuring arrangement associated with the release bearing arrangement or a release bearing arrangement side of the pressure medium force cylinder arrangement or friction clutch detects an actual release with a plurality of measurement receivers arranged in the housing so as to be distributed about the clutch axis. The housing has at least one housing opening, and at least several, preferably all, of the measurement receivers can be removed from the housing interior and reinstalled—possibly in the form of an exchangeable measurement sensor—through the at least one housing opening without disconnecting the drivetrain.

24 Claims, 7 Drawing Sheets

ACTUATION DEVICE FOR A FRICTION CLUTCH IN A DRIVETRAIN

BACKGROUND OF THE INVENTION

1. Field of the Invention

The invention is directed to an actuation device for a friction clutch which is arranged in a drivetrain of a motor vehicle between a drive unit and a transmission in a housing, particularly in a housing bell or housing cover, and which includes a pressure medium force cylinder arrangement which is arranged in the housing and which preferably comprises a pressure medium force ring cylinder. The friction clutch can be actuated by means of this pressure medium force cylinder arrangement via a release bearing arrangement which is movable coaxial to the friction clutch. A measuring arrangement associated with the release bearing arrangement or a release bearing arrangement side of the pressure medium force cylinder arrangement or friction clutch detects an actual disengagement or release and has a plurality of measurement receivers arranged in the housing so as to be distributed about the clutch axis.

2. Description of the Related Art

Actuation devices of the type mentioned above are known, for example, from DE 197 16 600 A1 and U.S. Pat. No. 5,950,788, whose disclosure is incorporated herein by reference. In the known actuation devices, the measurement receivers are formed by hydraulic measurement cylinders. In order to prevent the hydraulic measurement cylinders from exerting any substantial tilting moments on the release bearing arrangement or release bearing arrangement side of the pressure medium force cylinder arrangement (especially a pneumatic force cylinder arrangement), U.S. Pat. No. 5,950,788 discloses constructing the hydraulic measurement cylinders (or, generally, a measurement receiver arrangement or transmitter element arrangement) essentially symmetric to the clutch axis. Especially in case of a plurality of hydraulic measurement cylinders, the cylinders are arranged so as to be distributed about the clutch axis at the same circumferential angle and at the same radial distance, so that transverse forces which are exerted by the individual measurement cylinders and which derive from the actual release compensate one another. Accordingly, on the whole, there is no substantial tilting moment acting on the release bearing arrangement or on the release bearing arrangement side of the pressure medium force cylinder arrangement (for example, a pneumatic ring piston). The risk of self-locking of the pressure medium force cylinder arrangement or pneumatic force cylinder arrangement is reliably prevented in this way.

The disadvantage in this kind of arrangement of hydraulic measurement cylinders (generally, measurement receivers) in the housing cover is in that the measurement receivers in the housing cover are hardly accessible, if at all, as long as the engine and transmission are connected, that is, while the drivetrain is not interrupted. In particular, it is not possible to remove or reinstall—possibly in the form of an exchangeable measurement sensor—the measurement receivers for repair purposes or for exchanging a defective measurement receiver without disconnecting the drivetrain. However, disconnection of the drivetrain requires extensive disassembly and assembly and is consequently costly.

SUMMARY OF THE INVENTION

According to the invention, the actuation device is constructed in such a way that—with a housing having at least one housing opening—at least several, preferably all, of the measurement receivers can be removed from the housing interior and reinstalled—possibly in the form of an exchangeable measurement sensor—through the at least one housing opening without disconnecting the drivetrain.

Conceivably, the housing (housing cover) could be constructed with a plurality of housing openings or a very large housing opening to enable removal and installation of the measurement receivers without disconnecting the drivetrain. However, this solution is disadvantageous insofar as the housing cover is weakened structurally by a corresponding quantity of housing openings or by a very large housing opening, which is not desirable especially for utility motor vehicles. Moreover, a plurality of housing openings are not always possible. Therefore, in a preferred further development a transporting device is provided by means of which at least one of the measurement receivers can be transported from an operating position farther from an associated housing opening to a disassembly or removal position closer to the associated housing opening. In this connection, at least one of the measurement receivers can preferably be transported by the transporting device from an installation position which is closer to an/the associated housing opening and which possibly corresponds to the removal position to the operating position which is farther from the associated housing opening. By the terms operating position and installation or removal position is meant, on the one hand, the position usually occupied by the measurement receivers during driving operation in order to detect the actual release and, on the other hand, a position to which the measurement receiver is transported by means of the transporting device and from which the measurement receiver can be removed from the housing through the associated housing opening, or a position occupied by the measurement receiver in the housing after installation before it is transported to its operating position for normal driving operation.

It may be advisable that a plurality of measurement receivers can be transported by means of the transporting device—possibly successively in time—to a housing opening assigned jointly to these measurement receivers. A transporting device constructed in this way is advisable in particular when more than two measurement receivers are provided. A shared transporting device can then be provided for the measurement receivers.

There may be assigned to at least one measurement receiver an operating position in which the measurement receiver is associated with respect to position with a/the housing opening in such a way that it can be removed from the interior of the housing and can be installed again—possibly in the form of an exchangeable measurement sensor—without disconnecting the drivetrain. In this case, the operating position and the removal and installation positions coincide to a certain extent.

According to a preferred embodiment for the transporting device, it is suggested that this transporting device has at least one measurement receiver carrier which is movably mounted in the housing and which carries at least one measurement receiver and serves to transport the measurement receiver between an/the operating position which is farther from the housing opening and a/the removal or installation position which is nearer to the housing opening. In operation, the movably mounted measurement receiver carrier can also carry the measurement receiver which is removable from its operating position and is associated with the housing opening with respect to position. Alternatively, however, it is also possible that during operation the measurement receiver which is removable proceeding from its operating position and which is associated with the housing opening with respect to position is arranged at a measurement receiver carrier, preferably the pressure medium force ring cylinder, which is separate from the movably mounted measurement receiver carrier.

If it is desirable that a control/regulating valve arrangement which is associated with the pressure medium force cylinder arrangement and by means of which the pressure medium force cylinder arrangement can be actuated is arranged in comparatively close proximity to the pressure medium force cylinder arrangement, it may be advisable that the control/regulating valve arrangement is integrated in an actuation unit together with a measurement receiver. While it would be possible also to arrange the actuation unit in the housing so that it can be transported between an operating position and a removal and installation position by means of the transporting device, it seems particularly advisable to remove the actuation unit from its operating position and to reinstall it in this operating position. The measurement receiver which is integrated in the actuation unit can then be considered as a measurement receiver which can be removed proceeding from its operating position and which is associated with the housing opening with respect to position. This can be the only measurement receiver of this kind.

With respect to dependability of operation, it is advisable to fix the movably mounted measurement receiver carrier in position for operation by means of a positioning device. In this way, vibrations and the like cannot cause changes in position. Due to the fact that fixing in position could possibly be difficult to undo again, requiring the use of extensive force, for example, after a longer period of operation, it is suggested in a further development that a loosening device is provided in order at least to assist in loosening a measurement receiver carrier which is fixed in position.

To facilitate the installation and removal of the measurement receiver or measurement receivers, a drive device can be provided by means of which the movably mounted measurement receiver carrier is movable for transporting the at least one measurement receiver between its operating position and its removal or installation position. The drive device can advantageously have a toothed wheel gear unit which comprises, for example, a toothing formed at the measurement receiver carrier.

There are diverse possibilities with respect to the construction of the measurement receiver carrier. For example, the measurement receiver carrier can comprise a slide which is guided so as to be displaceable along a displacement path and which carries the at lest one measurement receiver. According to a particularly preferred variant, it is provided that the measurement receiver carrier comprises a rotating member or swiveling member which is mounted in the housing so as to be rotatable or swivelable, for example, a ring part or ring disk part surrounding the clutch axis. In this connection, it may be provided that the measurement receiver carrier is formed by the rotatably mounted pressure medium force ring cylinder or a carrying member arranged at the rotatably mounted pressure medium force cylinder.

According to another embodiment for the transporting device, the transporting device has at least one sliding guide in which at least one of the measurement receivers is guided in a displaceable manner between an/the operating position farther from the housing opening and a/the removal or installation position nearer to the housing opening. The sliding guide can comprise at least one elongated or link-like slot in a disk part arranged in the housing.

With regard to dependability of operation, it seems advisable that the measurement receiver can be fixed in the operating position. For example, the measurement receiver can be fixed by means of a fixing rod arrangement which can be supported at a supporting location which is stationary at least in operation, wherein the measurement receiver is held, for example, at a closed end of the sliding guide by means of this fixing rod arrangement.

The supporting location can be formed by a structural unit which contains a control/regulating valve arrangement by which the pressure medium force cylinder arrangement can be actuated. The structural unit can be arranged outside of the housing, for example, so that the valve arrangement is not subjected to the thermal influences occurring in the housing. With respect to the fixing rod arrangement, it is particularly preferable that it is formed by a line arrangement transmitting measurement signals from the measurement receiver to the structural unit. For instance, the line arrangement can be a hydraulic line arrangement which transmits measurement signals to the structural unit hydraulically, for example in the event that the measurement receivers are formed by hydraulic measurement cylinders. However, other line arrangements can also be considered, for example, an electric line arrangement, depending on the construction of the measurement receivers.

As was already indicated, the measurement receivers are preferably hydraulic measurement cylinders which are preferably arranged about the clutch axis in such a way that, in sum, essentially no tilting moment is exerted on a release bearing arrangement side of the pressure medium force cylinder arrangement by the measurement receivers. The measurement receivers are preferably arranged substantially symmetrically about the clutch axis.

In connection with the greatest possible structural strength of the housing, it is preferred that the housing has exactly one housing opening which is used for the installation and removal of the measurement receivers without disconnecting the drivetrain.

The invention is further directed to a motor vehicle drivetrain comprising a drive unit, a transmission and a friction clutch which is arranged between the drive unit and the transmission in a housing having at least one housing opening, and comprising an actuation device (preferably as described above), wherein at least several, preferably all, of the measurement receivers of this actuation device can be removed from the housing interior and reinstalled, possibly in the form of an exchangeable measurement sensor, without disconnecting the drivetrain.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE PRESENTLY PREFERRED EMBODIMENTS

First, the basic construction and manner of operation of an actuation device 10 (which can also be described as a release arrangement 10) will be described with reference to FIGS. 1 and 2 according to an embodiment example used, for example, in utility vehicles. The actuation device 10 is constructed in such a way that it surrounds an axis of rotation A of a motor vehicle friction clutch, not shown, essentially concentrically and various components of the same are constructed annularly and surround the axis of rotation A.

Visible on the radial outer side is a housing 12a of the actuation device 10 in which is integrated a valve arrangement 14, described in the following. A measuring arrangement 16 is located radially inside of the valve arrangement 14 and comprises two hydraulic measurement cylinders 20a and 20b each of which has a measurement piston 18a and 18b, respectively, which is displaceable in the direction of the axis of rotation A and which is arranged in a cylindrical space which is open on one axial side and formed in the housing 12a in the case of measurement cylinder 20a and in a separate measurement cylinder housing 12b in the case of measurement cylinder 20b and is open axially in the direction of the friction clutch. Sealing elements which seal the respective measurement cylinder act between the respective measurement piston and an inner circumferential wall of the respective cylindrical space.

At the end projecting out of the measurement cylinder 20a and 20b, respectively, the measurement pistons 18a and 18b engage in a displaceable manner with an annular pressure medium force piston 26 (which can also be defined as a release piston 26) by means of a spring element 24a and 24b, respectively, fixed to the end of the piston. The pressure medium force piston 26 is part of a pressure medium force cylinder arrangement 28 which can also be referred to as a release cylinder arrangement 28. In the present case, the pressure medium force cylinder arrangement is a pneumatic force cylinder arrangement. The release piston 26 can be displaced in direction of the axis of rotation A and is movement-coupled with the measurement pistons 18a and 18b with respect to axial movements by means of the spring elements 24a and 24b which engage around a radial outer edge of a ring flange of the ring piston or release piston 26.

A ring cylinder space 29 of the pneumatic force cylinder 28 is defined by a pipe part 30 and an annular wall part 31 with a radial outer wall portion 32 and a base portion 33 and a piston element 34 of the release piston 26, which piston element 34 engages in the ring piston space 29. Various sealing elements which seal the ring cylinder space 29 so as to be tight against pressure medium, particularly pneumatically tight, act between the release piston 26, especially its piston element 34, on one side and the pipe part 30 and wall part 31 on the other side. A pretensioning compression spring 38 is received in the ring cylinder space 29 and pretensions the release piston 26 in the direction of a stop of a release bearing 40 at an associated diaphragm spring arrangement or plate spring arrangement or the like of the friction clutch, this release bearing 40 being fixedly coupled to the release piston 26. The release bearing 40 comprises two bearing shells 48, 50, known per se, between which are arranged bearing balls. The bearing shell 48 is coupled with the release piston 26 and bearing shell 50 is rotatable about the axis of rotation A with respect to these structural component parts and cooperates with spring tabs, or the like, of the diaphragm spring arrangement or plate spring arrangement for releasing the clutch.

It should be noted that, in the present embodiment, the actuation device 10 is constructed for working together with a pushed clutch, but it would be possible to convert for working with a pulled clutch without extensive structural modifications.

The valve arrangement 14 is constructed in the manner of a pressure scale. A valve slide 60 is received so as to be displaceable in a bore hole or opening 58 in the housing 12a. The valve slide 60 is pretensioned toward the inside by a pretensioning spring 62 and is supported on the inner side by a flange at a shoulder of the opening 58. The pretensioning spring 62 is supported externally at insert parts 65, 66 which are inserted into the opening 58. The cup-like insert part 65 has an opening in its bottom on which a cover element 70 fits under pretensioning by a spring 68. The spring 68 is supported externally at the sleeve-like insert part 66 which is securely inserted into the bore hole 58. The insert part 66 has an opening 74 for supplying compressed air.

The slide 60 has an opening or bore hole 76 which opens toward the outside (to the cover element 70) and opens on the inside to a circumferential groove 82 via opening portions 78. The circumferential groove 82 communicates with a vent opening which is not visible in the sectional view. The inner end of the slide 60 defines a hydraulic chamber 90 which is connected to or can be connected to a hydraulic actuation system via hydraulic lines 92 penetrating the housing 12a and a safety valve, not shown in FIG. 1, having a hydraulic connection. The safety valve is inserted into a bore hole or opening 94 of the housing 12a and produces a hydraulic connection between the hydraulic connection of the safety valve and, via lines 92, the hydraulic chamber 90 only when compressed air with sufficient pressure is present at the connection 74. This prevents damage to the control/regulating valve 14 due to excessive hydraulic pressures in the hydraulic chamber 90.

The hydraulic actuation system which is connected to or can be connected to the hydraulic chamber 90 via the safety valve can comprise, for example, a master cylinder coupled with a clutch pedal, by means of which master cylinder hydraulic fluid is introduced via lines 92 into the hydraulic chamber 90 when the clutch pedal is depressed. The hydraulic chamber communicates in a fluid connection with the measuring arrangement 16, i.e., with the hydraulic measurement cylinder 20a of the latter, via a hydraulic channel 91.

The hydraulic cylinder 20a in turn is connected, via a hose 96, with the hydraulic measurement cylinder 20b which is arranged approximately diametrically opposite with respect to the axis of rotation A at approximately the same radial distance from the axis, so that the cylindrical spaces of the two measurement cylinders are connected in parallel hydraulically. Further, a pneumatic line, not shown in the sectional view, is formed in the housing 12a and, via a connection 97, provides a pneumatic connection between the portion of the bore hole 58 containing the pretensioning spring 62 and the annular cylinder space 29 of the release cylinder 28.

Figure 1:
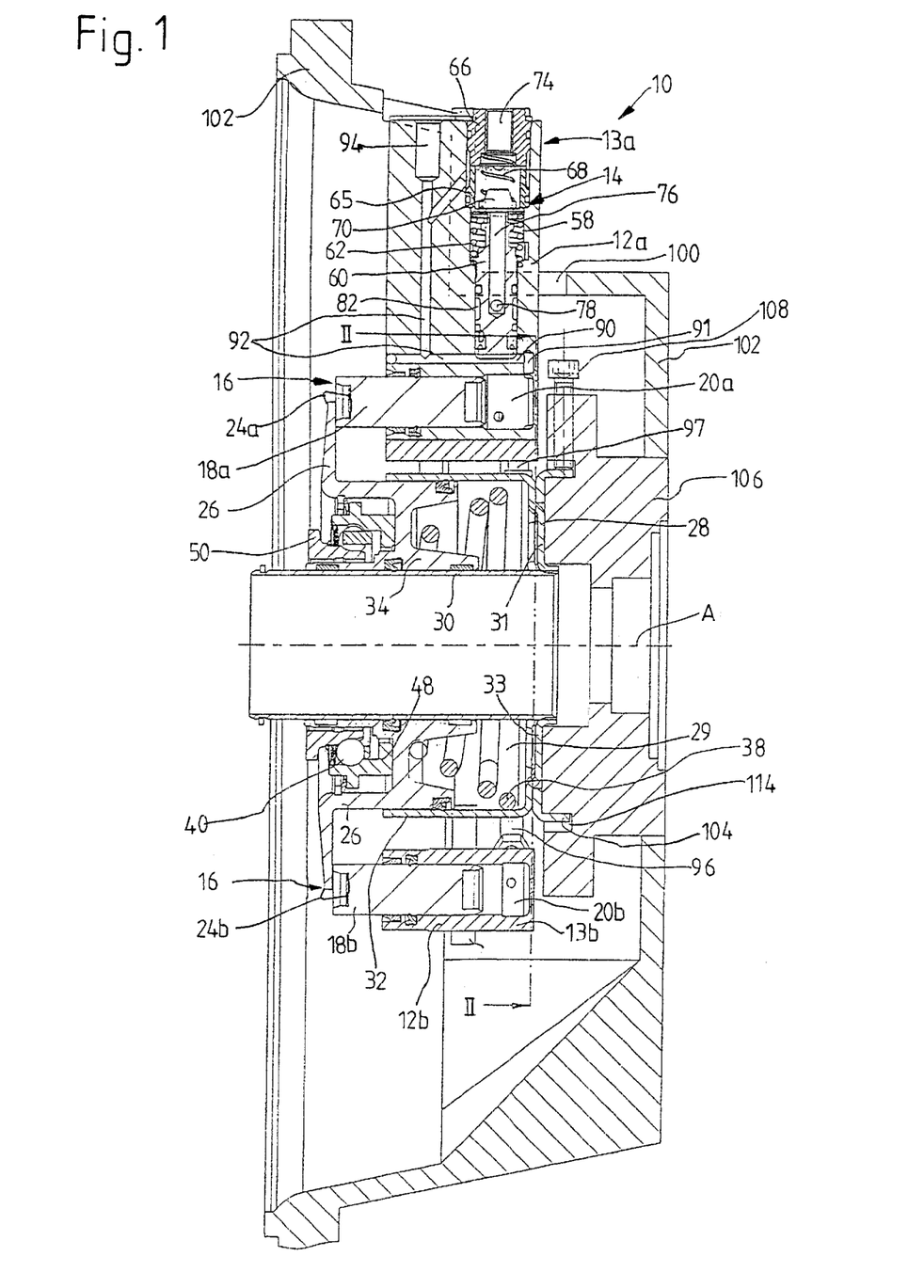
FIG. 1 is a longitudinal sectional view according to line I—I in FIG. 2 through an actuation device for a friction clutch in a motor vehicle with a pressure medium force cylinder, especially a pneumatic force cylinder, shown in partially moved out state.
Figure 2:
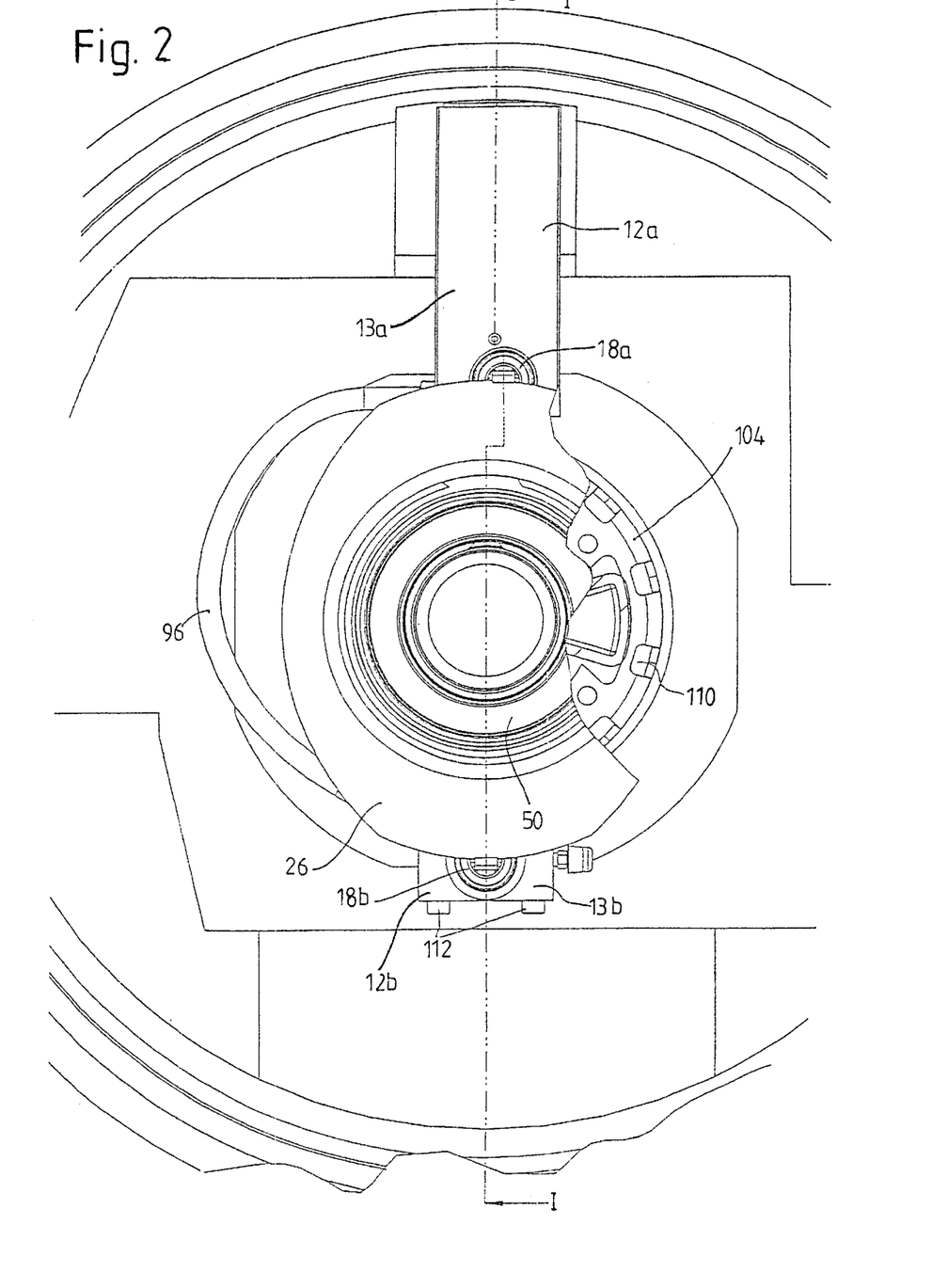
FIG. 2 shows the actuation device of FIG. 1 in a partial sectional view (section line II—II in FIG. 1) in axial direction viewed in the direction from the clutch to the pneumatic piston and the release bearing arrangement of the actuation device.

The manner of operation of the actuation device 10 of FIGS. 1 and 2 is described in more detail in the following.

In the engaged state, the release piston 26 and the two measurement pistons 18a and 18b are in their extreme inward axial positions corresponding to the worn state of the clutch, and the slide 60 is in its innermost position due to its pretensioning by the spring 62, so that the outermost end of the slide 60 is lifted (toward the inner side) by the cover element 70 sitting on the bottom of the insert part 65, A venting connection is accordingly produced between the annular space 29 and the vent opening via the above-mentioned pneumatic line in the housing 12a, the portion of the bore hole 58 containing the spring 62, the bore hole 76 in the slide 60, the openings 78 and the circumferential groove 82. Accordingly, there is no pressure in the ring cylinder space 29 through which the release piston 26 could be pressed in the direction of the clutch.

If hydraulic fluid volume were guided into the hydraulic chamber 90 via the hydraulic connection 94 of the safety valve, the safety valve and the lines 92 in order to carry out a release process, for example, by depressing a clutch pedal and thereby displacing a certain volume of hydraulic fluid from a master cylinder of the clutch pedal and directing it to the hydraulic connection, this would result in the slide 60 being displaced outward by the hydraulic pressure building up in the chamber 90. As a further consequence, a radial outer portion of the slide 60 which engages in the opening of the insert part 65 fits on the cover element 70 and, due to the closing of the bore hole 76 toward the outside, interrupts the venting connection between the ring cylinder space 29 and the vent opening which was described above. If the hydraulic pressure is further increased, i.e., if more hydraulic fluid is displaced in the hydraulic chamber 90, the slide 60 pushes the cover element 70 outward against the pretensioning of the spring 68. The cover element 70 is lifted from the base of the insert part 65 and accordingly releases a pneumatic connection between the connection 74 and the portion of the bore hole 58 containing the spring 62 and accordingly the ring cylinder space 29, so that compressed air can flow into the ring cylinder space 29. This increases the pnuematic pressure in the ring cylinder space 29 and the release piston 26 is displaced against the pretensioning of the diaphragm spring or the like in the direction of the clutch. In so doing, the release piston 26 takes along the measurement pistons 18a, 18b by means of the spring elements 24a, 24b, so that the hydraulic fluid contained in the hydraulic chamber 90 can flow into the free space formed in the measurement cylinders 20a, 20b.

Since the hydraulic fluid which is under pressure can flow out of the hydraulic chamber 90, the pressure in the hydraulic chamber 90 decreases when the clutch pedal or the like is held constant, so that the slide 60 is displaced inward again, specifically to the extent that the cover element 70 again closes the through-opening in the base of the insert part 65. A state of equilibrium is then reached in which the slide 60, the release piston 26 and, accordingly, in a compulsory manner, also the measurement pistons 18a, 18b retain their respective positions or locations.

It will be seen from the preceding description that the volume which is made available in the measuring arrangement 16 by the displacement of the measurement pistons 18a, 18b and in which the hydraulic fluid is received from the hydraulic chamber 90 is a measurement for the axial positioning of the release piston 26 and, therefore, for the release position. This means that a determined volume of space created in the measuring arrangement 16 and a correspondingly determined release position of the release piston 26 is associated with every determined change in pressure in the actuation arrangement, i.e., in the master cylinder, which causes a displacement of a determined fluid volume in the direction of the hydraulic chamber 90. The valve arrangement 14 regulates the supply of compressed air to the ring cylinder space 29 corresponding to the actual release position of the release piston 26 which corresponds to the hydraulic fluid volume displaced by the master cylinder of the actuation device, which is a command variable. Finally, the valve arrangement 14 regulates the compressed air supply to the ring cylinder space 29 depending on the hydraulic pressure prevailing in the hydraulic chamber 90 (and accordingly in the measurement cylinders 20a, 20b) and which is determined in turn by the detected actual release position and the extent of actuation of the master cylinder, that is, the command variable.

When the actuation pedal or the like is released subsequently, the hydraulic fluid contained in the hydraulic chamber 90 can flow out via the lines 92 and the hydraulic connection of the safety valve, so that the slide 60 can now be displaced further inward and be lifted from the cover element 70 in inward direction by its outer end portion. The venting path described above is then opened, so that the release piston 26 can move toward the right with reference to the view in FIG. 1, either into its engagement position or again into a position in which a state of equilibrium takes place, as was described above.

Corresponding to the hydraulic pressures prevailing in the measurement cylinders 20a, 20b, the measurement pistons 18a, 18b exert pressure forces on the release piston 26, wherein every measurement piston, taken by itself, exerts a tilting moment on the release piston 26 with respect to the axis of the release cylinder 28 coinciding with the axis of rotation. However, the tilting moments exerted by the two measurement pistons are essentially directed opposite each other and are approximately identical in terms of amount, so that the tilting moments essentially compensate for one another and the resulting tilting moment approaches zero or is at least negligible. For compensation of the tilting moments, the two measurement cylinders 20a, 20b preferably have the same cross sections and are arranged approximately symmetric to the axis A, that is, they are located approximately diametrically opposite one another (in relation to axis A) with at least approximately identical radial distance from axis A. Deviations from the ideal symmetry with respect to axis A which are shown in FIG. 2 lead to a minimum resultant residual tilting moment which is insignificant with respect to the operability of the actuation device. The deviation from the ideal symmetry was taken into account for reasons not relevant in the present context connected with installation space considerations.

The unit 13a which can also be referred to as the measuring and control/regulating unit 13a or actuation unit 13a and which comprises the valve arrangement 14, the hydraulic measurement cylinder 20a and the housing 12a is removably arranged on the release cylinder 28. It projects outward out of an opening 100 of a housing cover 102 and can be removed without disconnecting the drivetrain formed of a drive unit (an engine), a transmission and the friction clutch arranged therebetween.

Although the other measurement cylinder 20b is arranged in the housing cover 102 essentially diametrically to the housing cover opening 100 with respect to the axis A, the actuation unit 13b forming the measurement cylinder 20b and the measurement cylinder housing 12b can be removed through the opening 100 without disconnecting the drivetrain. For this purpose, the release cylinder 28 is rotatably mounted with respect to the axis A and serves to a certain extent as a transporting device for transporting the measurement cylinder 20b or unit 13b toward the housing cover opening 100, which measurement cylinder 20b is arranged at the release cylinder 28 and can be referred to generally as measurement receiver.

A pot-shaped flange 104 is fastened to the release cylinder or pneumatic cylinder 28 for rotatable mounting of the latter, the portion of the flange 104 extending in axial direction for fastening and centering the release cylinder 28 is fastened to, supported and centered at the housing cover 102 via an intermediate piece 106. A screw 108 serves to clamp the flange 104 in order to secure the release cylinder 28 in a desired rotational position. Instead of the screw, other positive-locking and frictional-locking fasteners can also be provided, for example, springs, clamps, hooks, catch devices and the like.

If the second measurement cylinder 20b must be exchanged in case of maintenance or repair, the housing 12a with the control/regulating valve 14 and the first measurement cylinder 20a is detached and swiveled away from the release cylinder 28. The screw 108 is then unscrewed and, if required, the flange 104 which may become stuck under certain circumstances is loosened. A special loosening or press-down device can also be provided for this purpose and is integrated in the actuation device. The whole release cylinder 28 can now be rotated by a tool (e.g., a screwdriver). For this purpose, the tool can engage in openings 110 formed at the flange 104 (or, alternatively, can engage at projections provided on the flange). The release cylinder 28 is rotated until the measurement cylinder housing 12b of the second measurement cylinder 20b comes to rest at the opening 100 in the housing cover 102. Screws 112 holding the measurement cylinder housing 12b at the release cylinder 28 can then be loosened, whereupon the measurement cylinder housing 12b (the unit 13b) can be removed from the housing cover 102. The measurement cylinder 20b or, alternatively, an exchanged measurement cylinder 20b can then be mounted again in reverse order.

In a repair of this kind, the release cylinder 28 is pretensioned by the diaphragm spring of the clutch and the preload spring 38, so that the flange 104 cannot spring out of its guide formed by an annular groove 114 in the intermediate piece 106. Accordingly, axial fixing by means of screws 108 is required only before completion of the drivetrain with engine and transmission.

Other embodiments of actuation devices according to the invention are described in the following, wherein the same reference numbers are used for identical, analogous and corresponding components and functional elements. Only differences from the rest of the embodiment examples are addressed; in other respects, reference is made exclusively to the rest of the embodiment examples.

Figure 3:
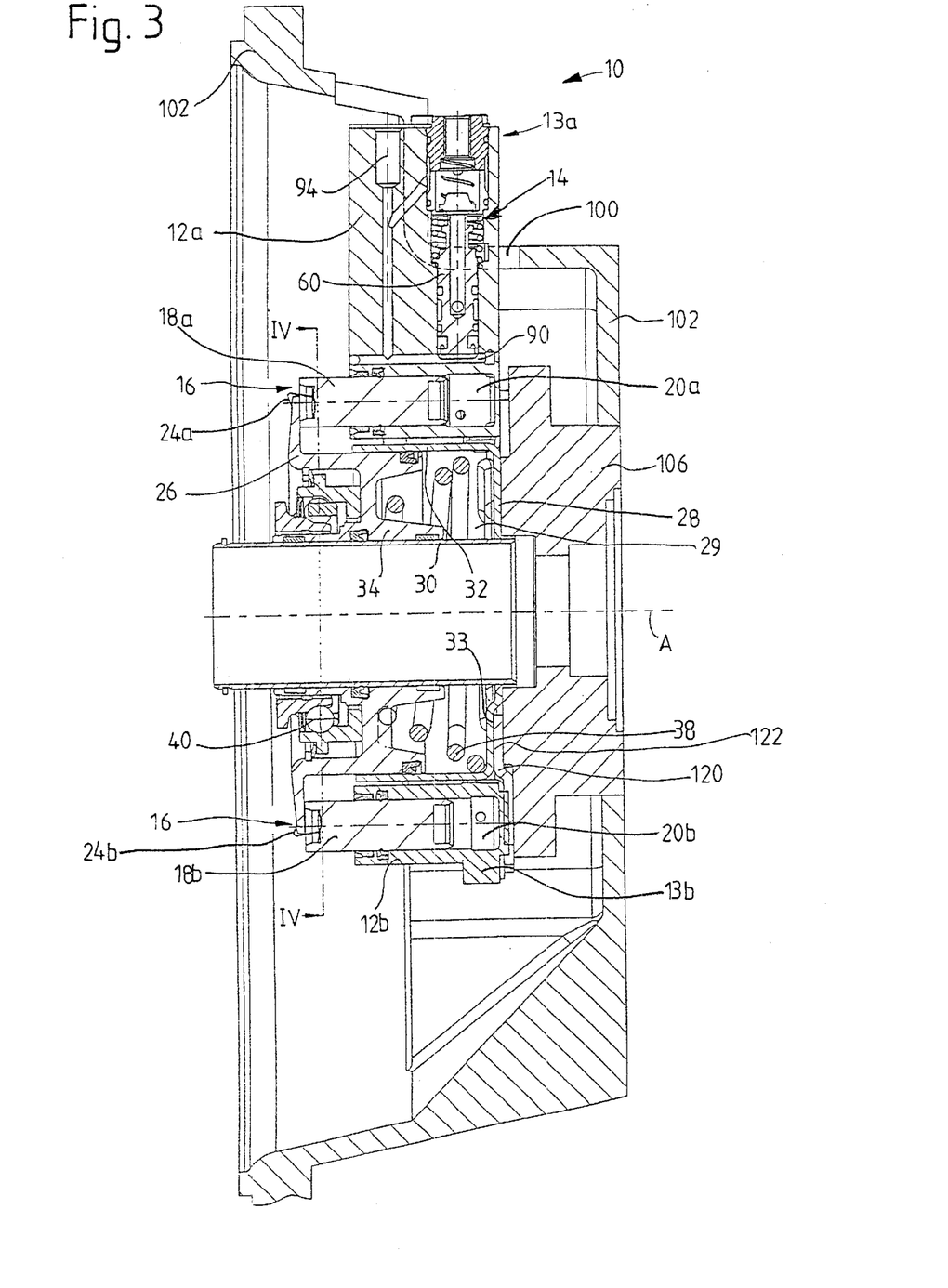
FIG. 3 shows a view corresponding to FIG. 1 of a second embodiment form of an actuation device according to the invention (longitudinal section along line III—III in FIG. 4)

FIG. 3 shows an embodiment example in which a carrying disk 120 is provided and at which the measurement cylinder housing 12b of the second measurement cylinder 20b is arranged. The carrying disk 120 has tab segments 122 which engage in indentations in the release cylinder base 33 in order to bring the carrying disk 120 into a rotational coupling engagement with the release cylinder 28. The carrying disk 120 can be fixedly arranged at the release cylinder 28. But because of the pretensioning of the release cylinder by the preload spring 122 and the diaphragm spring of the clutch, the carrying disk 120 is sufficiently clamped between the release cylinder base 33 and the intermediate piece 106 in the completed drivetrain, so that it is not absolutely necessary for the carrying disk 120 to be fixed axially to the release cylinder 28.

Figure 4:
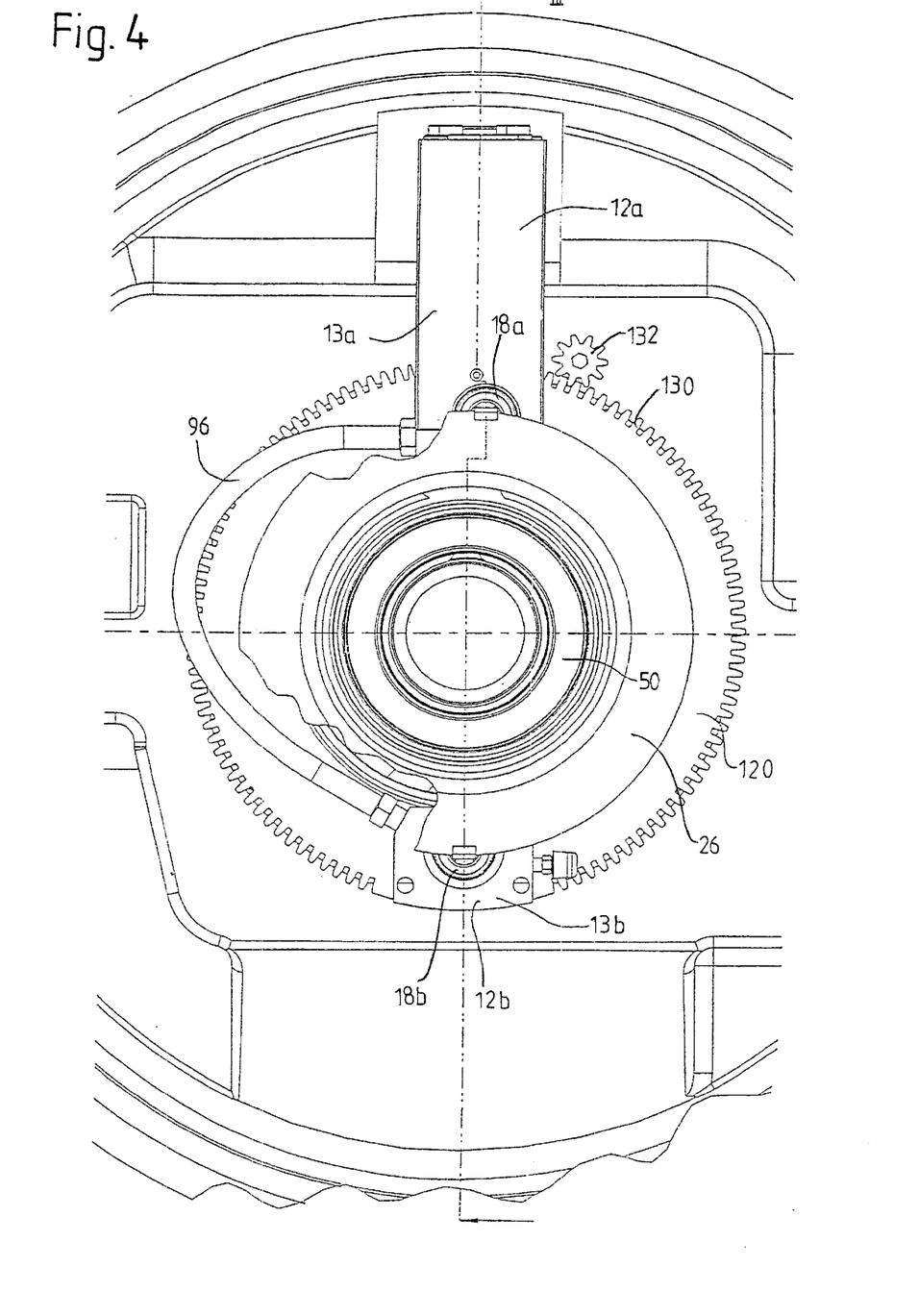
FIG. 4 shows an axial view corresponding to FIG. 2 of the actuation device of FIG. 2 (partial cross section along line IV—IV in FIG. 3)

The removal and installation of the measurement cylinder housing 12b is carried out to a very great extent exactly as in the first embodiment example. First, the housing 12a having the valve arrangement 14 and the first measurement cylinder 20a is removed through the opening 100. Subsequently, the release cylinder 28 is rotated together with the carrying disk 122 until the housing 12b with the second measurement cylinder 20b can be removed from the opening 100. In order to facilitate the rotating transport of the second measurement cylinder 20b by means of the carrying disk 120, the latter can have an external toothing 130, as is shown in FIG. 4, which meshes with a mating gear 132 (here a pinion gear but possibly a worm wheel). As a result of the rotation of the mating gear 132, for example, with a ratchet, the carrying disk 120 is rotated along with the rotation of the release cylinder 28 and consequently carries the second measurement cylinder 20b to the housing cover opening 100. A drive device for rotational driving of the carrier of the second measurement cylinder 12b could also be provided in the first embodiment example according to FIGS. 1 and 2.

It should be mentioned that in contrast to the view in FIG. 3, the measurement cylinder 20b could also be fastened to a separate carrying disk which is arranged so as to be rotatable relative to the release cylinder 28 and the release cylinder 28 is not rotated along with it in order to remove the second measurement cylinder. However, a synchronous rotation of the release cylinder 28 together with the measurement cylinder carrier (carrying disk 120) is only useful as long as the displacing engagement persists between the measurement piston 18b and the release piston 26 by means of the spring element 24b during the rotational transport of the second measurement cylinder 20b. It is only when the second measurement cylinder 20b is removed from the housing cover through the opening 100 that a portion of the spring element 24b engaging the end of the release cylinder 26 slides away from the annular flange of the release piston 26 due to the corresponding outward radial displacement of the unit 13b. The same is true for the spring element 24a when removing the housing 12a. This also applies to the spring elements 24a and 24b of the first embodiment example according to FIGS. 1 and 2.

It should be mentioned in addition that the engagement between the spring elements 24a and 24b and the release piston 26 can easily be produced again when installing the housing 12a or the housing 12b; this is facilitated by the formation of spring elements 24a, 24b with stop bevels which is shown in the FIGS. This is the subject matter of a separate application filed by the Applicant simultaneously (DE 100 18 633.5.

Figure 5:
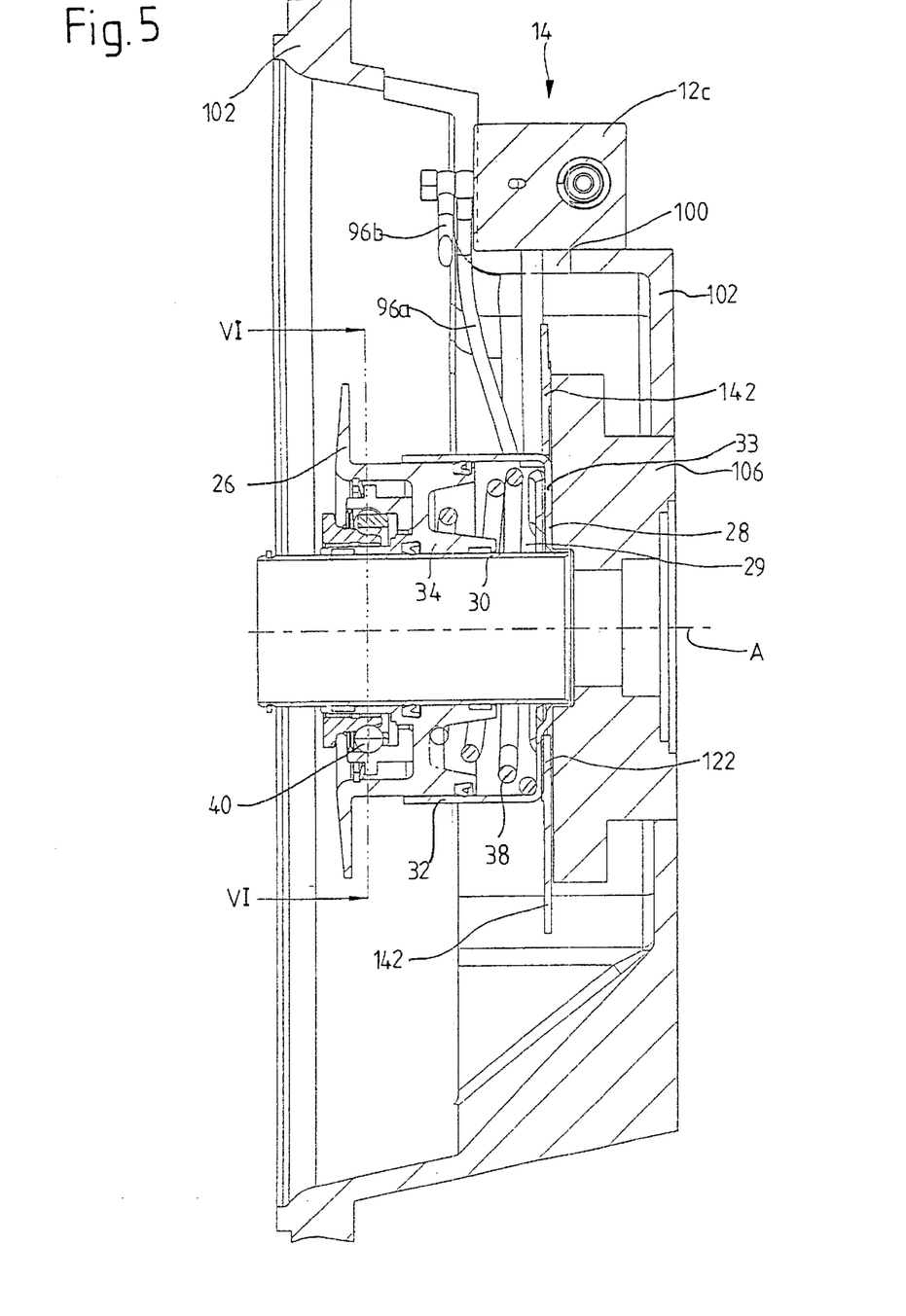
FIG. 5 shows a view corresponding to FIG. 1 of a third embodiment form of an actuation device according to the invention (longitudinal section according to line V—V in FIG. 6)
Figure 6:
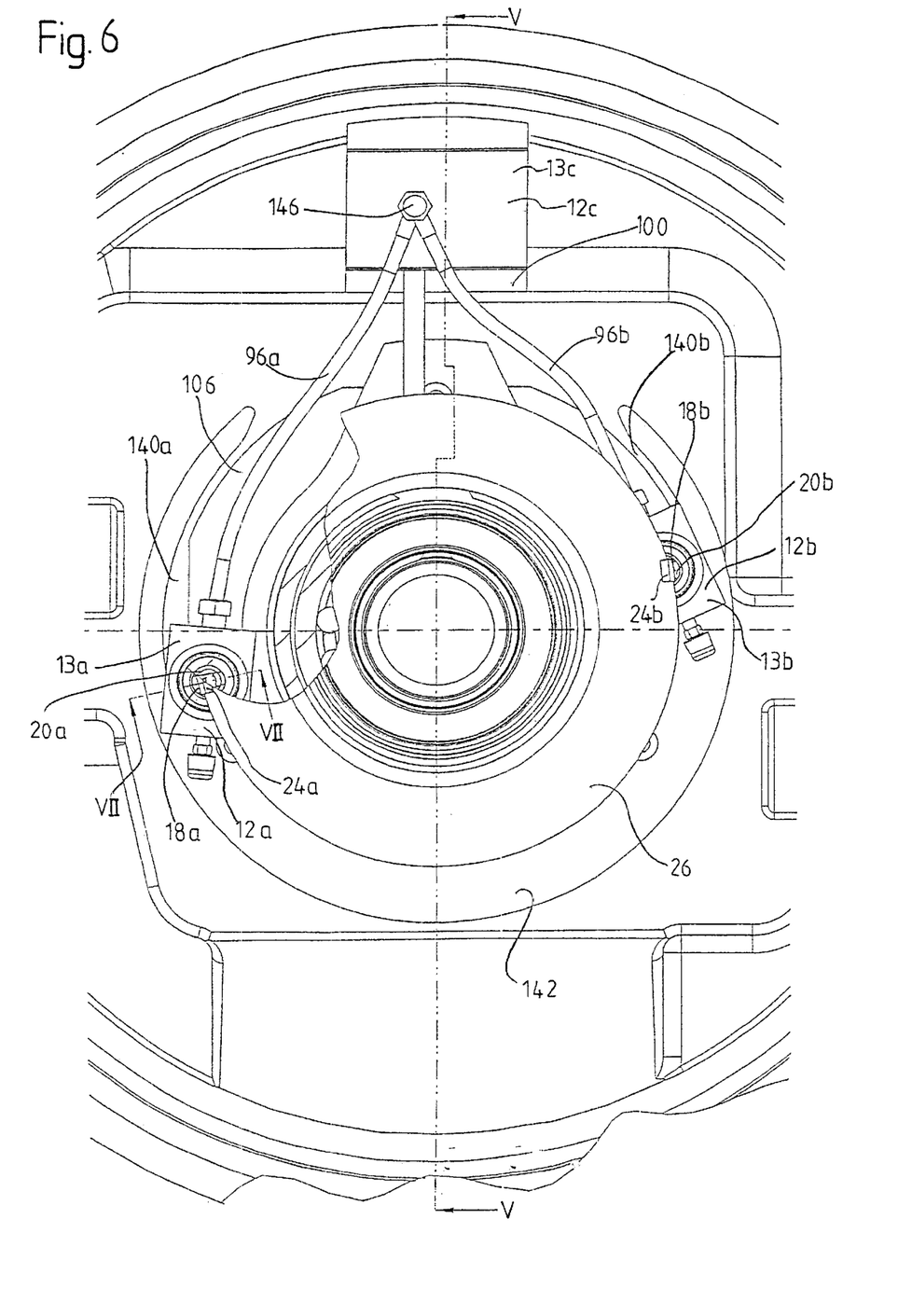
FIG. 6 is an axial view corresponding to FIG. 2 of the actuation device in FIG. 5 (partial cross section along line VI—VI in FIG. 5)
Figure 7:
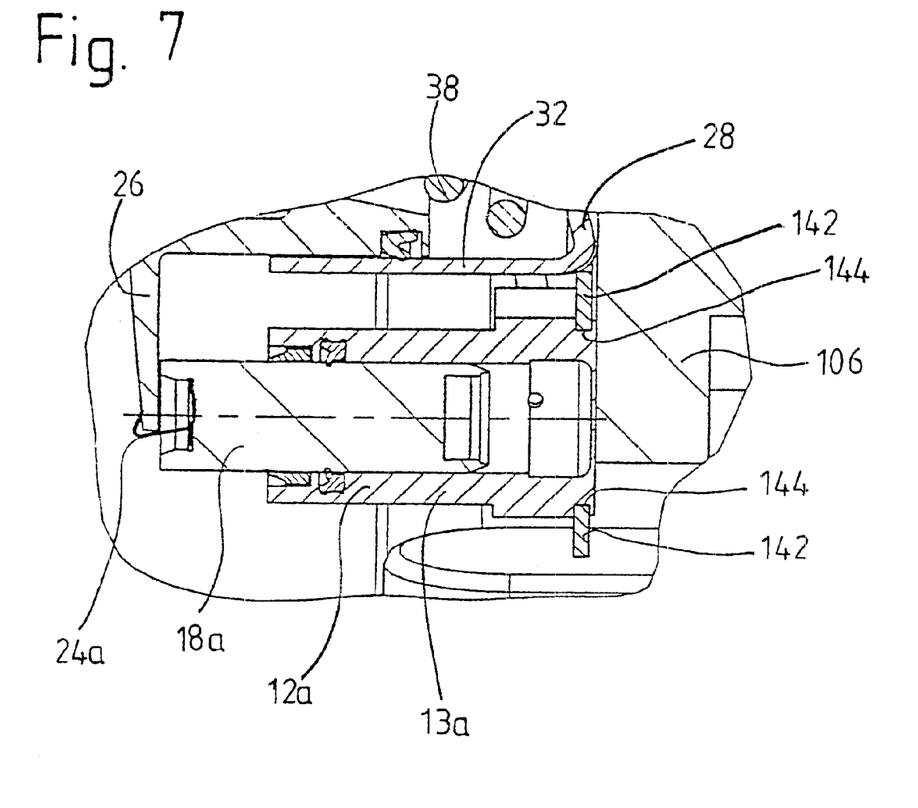
FIG. 7 shows a sectional view of an area of the actuation device of FIGS. 5 and 6 along section line VIII—VII in FIG. 6.

In the third embodiment example in FIGS. 5 to 7, a housing 12c containing the control/regulating valve arrangement 14 is fastened to the outside of the housing 102 and has no measurement receivers for detecting the actual release. The valve arrangement 14 communicates, via hydraulic lines, with two separate hydraulic measurement cylinders 20a and 20b which are formed in measurement cylinder housings 12a and 12b, respectively. Each of the two measurement cylinders 20a and 20b has a measurement piston 18a and 18b, respectively, which is in a displacing engagement with the release piston 26 by means of a spring element 24a and 24b.

The two measurement cylinder housings 12a and 12b are guided in a rail-like manner in slot-like or elongated cutouts 140a and 140b of a guiding and holding disk 142 (see in particular FIG. 6) which define circular arc-shaped paths; the guiding and holding disk 142 is fastened to the release cylinder 28 and is secured against rotation at the latter by tab portions 122 similar to the tab portions 122 of carrying disk 120 of the embodiment example in FIGS. 3 and 4. The release cylinder 28 itself is likewise secured against rotation about the axis A in a manner which is known per se.

The measurement cylinder housings 12a and 12b each have guide grooves 144 in sliding engagement—with reference to a displacement of the respective housing along the respective cutout—with edge portions of the guiding and holding disk 142 which define the respective cutout 140a or 140b. The measurement cylinder housings 12a and 12b can accordingly be displaced on a circular arc-shaped path along the respective cutout 140a and slide to a certain extent along rails formed by the edge portions of the disk 142 which define the cutout. In its operating position shown in FIG. 6, the measurement cylinder housings 12a and 12b are held by the rigidly constructed hydraulic lines 96a and 96b which are supported at the housing 12c of the valve arrangement 14.

In order to disassemble the valve housing 12c and remove the measurement cylinder housings 12a and 12b, a hollow screw 146 serving as a connection for the hydraulic lines 96a and 96b is loosened so that the hydraulic lines 96a and 96b are swivelable angularly. If it has not already been done, the valve housing 12c is to be detached and the valve housing 12c (valve unit 13c) can then be removed from the housing cover, wherein the measurement cylinder housings 12a and 12b are pulled along the respective cutout 140a and 140b via the hydraulic lines 96a and 96b. The measurement cylinder housings 12a and 12b (units 13a and 13b) slide along the above-mentioned rails and can then be removed from the housing opening 100. Since the hydraulic lines 96a and 96b have different lengths, the opening 100 can be constructed very small, so that the measurement cylinder housings 12a and 12b come to rest one on top of the other before passing through the opening 100 and accordingly need not pass through the opening 100 simultaneously. Measurement cylinder housing 12b passes through the opening 100 first and is then followed by measurement cylinder housing 12a.

Instead of rigid hydraulic lines, flexible lines can also be used. In this case, separate fixing means are required for fixing the measurement cylinder housings in their operating positions. For example, separate fixing rods or the like can be used.

To summarize, the invention is directed to an actuation device for a friction clutch which is arranged in a drivetrain of a motor vehicle between a drive unit and a transmission in a housing, particularly in a housing cover, and which comprises a pressure medium force cylinder arrangement which is arranged in the housing and which preferably comprises a pressure medium force ring cylinder, wherein, by means of this pressure medium force cylinder arrangement, the friction clutch can be actuated via a release bearing arrangement which is movable coaxial to the friction clutch, and a measuring arrangement which is associated with the release bearing arrangement or a release bearing arrangement side of the pressure medium force cylinder arrangement or friction clutch and which detects an actual release and has a plurality of measurement receivers arranged in the housing so as to be distributed about the clutch axis. It is suggested that the housing has at least one housing opening and that at least several, preferably all, of the measurement receivers can be removed from the housing interior and reinstalled—possibly in the form of an exchangeable measurement sensor—through the housing opening without disconnecting the drivetrain.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

We claim:

1. An actuation device for a friction clutch arranged in a drivetrain of a motor vehicle between a drive unit and a transmission, said friction clutch having a clutch axis, said actuation device comprising a housing having at least one opening, a pressure medium force cylinder arranged in the housing, a release bearing which is movable coaxial to the friction clutch to actuate the friction clutch in response to actuation of the pressure medium force cylinder, a plurality of measurement receivers distributed about the clutch axis inside said housing, said measurement receivers being removable from inside said housing and replaceable in said housing through said at least one opening without disconnecting the drivetrain, and a transporting device which can transport at least one of said measurement receivers from an operating position remote from said at least one housing opening to a removal position proximate to said at least one housing opening, said transporting device comprising at least one measurement receiver carrier which is movably mounted in the housing and which carries at least one said measurement receiver and serves to transport said at least one measurement receiver from the operating position to the removal position.

2. An actuation device according to claim 1 wherein said transporting device can transport at least one of said measurement receivers from an installation position proximate to said at least one housing opening to said operating position.

3. An actuation device according to claim 1 wherein said transporting device can transport said measurement receivers successively to a common said housing opening.

4. An actuation device according to claim 1 wherein at least one measurement receiver has an operating position which is coincident with said removal position.

5. An actuation device according to claim 4 wherein only one said measurement receiver has an operating position which is coincident with said removal position, said actuation device further comprising an actuation unit, said actuation unit comprising a control valve arrangement for actuating the pressure medium force cylinder and said only one measurement receiver.

6. An actuation device according to claim 1 wherein said movably mounted measurement receiver carrier also carries at least one measurement receiver having an operating position which is coincident with said removal position.

7. An actuation device according to claim 1 wherein at least one measurement receiver has an operating position which is coincident with said removal position is arranged at a measurement receiver carrier which is separate from the movably mounted measurement receiver carrier.

8. An actuation device according to claim 1 further comprising a positioning device for fixing said movably mounted measurement receiver carrier in place during operation, said positioning device comprising a loosening device for loosening said movably mounted measurement receiver carrier so that it can be moved.

9. An actuation device according to claim 1 further comprising a drive device for moving the movably mounted measurement receiver carrier to transport said at least one measurement receiver from the operating position to the removal position.

10. An actuation device according to claim 9 wherein said drive device comprises a gear, said measurement receiver carrier having teeth which mesh with said gear.

11. An actuation device according to claim 1 wherein said movable measurement receiver carrier comprises a slide which carries said at least one measurement receiver, said slide being guided for displacement along a displacement path.

12. An actuation device according to claim 1 wherein said measurement receiver carrier comprises one of a rotating member which is rotatably mounted in said housing and a pivoting member which is pivotably mounted in said housing.

13. An actuation device according to claim 1 wherein said pressure medium force cylinder is a rotatably mounted pressure medium force ring cylinder, said movably mounted measurement receiver carrier being formed by the roatably mounted pressure medium force ring cylinder.

14. An actuation device according to claim 1 wherein the transporting device comprises a sliding guide, said at least one measurement receiver being displaceable in said guide between said operating position and said removal position.

15. An actuation device according to claim 14 wherein said sliding guide comprises a disk part arranged in the housing, said disk part having at least one elongate slot.

16. An actuation device according to claim 14 further comprising means for fixing said at least one measurement receiver in said operating position in said sliding guide.

17. An actuation device according to claim 16 wherein said means for fixing comprises a fixing rod arrangement connected between said at least one measurement receiver and a supporting location which is fixed during operation.

18. An actuation device according to claim 17 wherein said supporting location comprises a structural unit having therein a control valve for actuating the pressure medium force cylinder, said control rod arrangement comprising at least one line for transmitting measurement signals from said at least one measurement receiver to said structural unit.

19. An actuation device according to claim 18 wherein said at least one line is at least one hydraulic line which transmits measurement signals to said structural unit hydraulically.

20. An actuation device according to claim 1 wherein each said measurement receiver is a hydraulic measurement cylinder, said hydraulic measurement cylinders being arranged about the clutch axis so that essentially no net tilting moment is exerted on the pressure medium force cylinder by the measurement receivers.

21. An actuation device according to claim 1 wherein said measurement receivers are symmetrically arranged about said clutch axis.

22. An actuation device according to claim 1 wherein said housing has only one opening for removal and replacing said measurement receivers.

23. Motor vehicle drivetrain comprising a drive unit, a transmission, a friction clutch arranged between the drive unit and the transmission, said friction clutch having a clutch axis, and an actuation device for said friction clutch, said actuation device comprising a housing having at least one opening, a pressure medium force cylinder arranged in the housing, a release bearing which is movable coaxial to the friction clutch to actuate the friction clutch in response to actuation of the pressure medium force cylinder, and a plurality of measurement receivers distributed about the clutch axis inside said housing, said measurement receivers being removable from inside said housing and replaceable in said housing through said at least one opening without disconnecting the drivetrain, and a transporting device which can transport at least one of said measurement receivers from an operating position remote from said at least one housing opening to a removal position proximate to said at least one housing opening, said transporting device comprising at least one measurement receiver carrier which is movably mounted in the housing and which carries at least one said measurement receiver and serves to transport said at least one measurement receiver from the operating position to the removal position.

24. An actuation device according to claim 1 wherein said housing has only one opening for removing and replacing said measurement receivers.

* * * * *